UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

PROCESS OF EFFECTING CHEMICAL REDUCTIONS AND PRODUCING METALS OR ALLOYS.

No. 866,421.     Specification of Letters Patent.     Patented Sept. 17, 1907.

Application filed January 31, 1907. Serial No. 355,139.

*To all whom it may concern:*

Be it known that I, FREDERICK M. BECKET, a citizen of the United States, residing at Niagara Falls, in the county of Niagara and State of New York, have invented certain new and useful Improvements in Processes of Effecting Chemical Reductions and Producing Metals or Alloys, of which the following is a specification.

This process is especially designed for the reduction of metallic oxids, such as those of vanadium, molybdenum, chromium, titanium and tungsten. The process involves reduction in two stages, in the first of which partial reduction, specifically from a higher to a lower state of oxidation, is effected by a non-metallic reagent, such as carbon, hydrogen, carbon monoxid, or a hydrocarbon; and further reduction, specifically to a metal, by a metallic reagent, such as silicon, ferro-silicon or aluminium.

For the purpose of illustration, the production of ferro-vanadium will be described. An oxid ore of vanadium, or an ore which has been treated to convert the vanadium to the oxidized state, or a concentrate from such ores, intimately mixed with carbon in amount sufficient to effect reduction of vanadic oxid to vanadous oxid and of any ferric oxid that may be present to ferrous oxid, is heated in a suitable combustion or electric furnace to the moderate temperature required for the partial reduction of these oxids. An example of the reducing action of carbon on vanadic oxid may be expressed by the reaction:

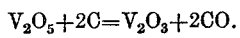

The material containing the partially reduced vanadium oxid is then mixed with a metallic reducing agent, such as silicon, ferro-silicon or aluminium, and smelted, preferably in an electric furnace, at the temperature necessary to effect complete reduction of the oxid to vanadium. The percentage of iron in the alloy is controlled by the percentage of iron oxid in the vanadium ore or concentrate used, by the addition of iron, or by the percentage of iron in the metallic reducing agent employed. The final reduction, using either silicon or aluminium, is represented by the equations:

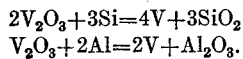

I have found that gaseous reducing agents may be efficiently employed in the first stage of the process, the reduction from a higher to a lower state of oxidation, producer gas and water gas being particularly advantageous for the purpose.

The chief advantage of this process consists in effecting the partial reduction of metallic oxids by means of relatively inexpensive non-metallic reducing agents, thereby largely diminishing the amount of the more expensive metallic reducing agents required for complete reduction to the metallic state, in the production of low-carbon metals or alloys.

In the claims silicon is classed as a metal and the terms "metallic reagent", "metal", "silicon", are intended to include metallic alloys, such as ferrosilicon.

I claim:

1. The process of reducing oxids, which consists in effecting partial reduction by the oxidation of a nonmetal and further reduction by the oxidation of silicon.

2. The process of reducing oxids, which consists in effecting partial reduction by the oxidation of carbon and complete reduction by the oxidation of silicon.

3. The process of reducing vanadic oxid, which consists in effecting reduction to vanadous oxid by a non-metallic reagent and reduction to vanadium by a metallic reagent.

4. The process of reducing vanadic oxid, which consists in effecting reduction to vanadous oxid by the oxidation of carbon and reduction to vanadium by the oxidation of a metal.

5. The process of reducing vanadic oxid, which consists in effecting reduction to vanadous oxid by the oxidation of a nonmetal and reduction to vanadium by the oxidation of silicon.

6. The process of reducing vanadic oxid, which consists in effecting reduction to vanadous oxid by the oxidation of carbon and reduction to vanadium by the oxidation of silicon.

7. The process of reducing refractory metallic oxids, which consists in effecting partial reduction by electrically smelting a mixture of the oxid and carbon, and effecting complete reduction of the product by a metallic reagent.

8. The process of reducing refractory metallic oxids, which consists in effecting partial reduction by electrically smelting a mixture of the oxid and carbon, and effecting complete reduction of the product by silicon.

9. The process of effecting chemical reductions, which consists in effecting partial reduction by a non-metallic reagent and further reduction by a metallic reagent and electrically-supplied heat.

10. The process of reducing refractory metallic oxids, which consists in effecting partial reduction by the oxidation of a non-metal and complete reduction by a metallic reagent and electrically-supplied heat.

11. The process of reducing oxids, which consists in effecting partial reduction by the oxidation of a non-metal and further reduction by the oxidation of silicon and electrically-supplied heat.

12. The process of reducing oxids, which consists in effecting partial reduction by the oxidation of carbon and complete reduction by the oxidation of silicon and electrically-supplied heat.

13. The process of effecting chemical reductions, which consists in effecting partial reduction by a non-metallic reagent and further reduction by a metallic reagent, and electrically supplying heat to effect both reductions.

14. The process of reducing vanadic oxid, which consists in effecting reduction to vanadous oxid by a nonmetallic reagent and reduction to vanadium by a metallic reagent and electrically-supplied heat.

15. The process of reducing vanadic oxid, which consists in effecting reduction to vanadous oxid by the oxidation of carbon and reduction to vanadium by the oxidation of a metal and electrically-supplied heat.

16. The process of reducing vanadic oxid, which consists in effecting reduction to vanadous oxid by the oxidation of a nonmetal and reduction to vanadium by the oxidation of silicon and electrically-supplied heat.

17. The process of reducing vanadic oxid, which consists in effecting reduction to vanadous oxid by the oxidation of carbon and reduction to vanadium by the oxidation of silicon and electrically-supplied heat.

In testimony whereof, I affix my signature in presence of two witnesses.

FREDERICK M. BECKET.

Witnesses:
C. C. MOSHER,
E. H. SCHMITT.